United States Patent
Muramatsu et al.

(10) Patent No.: US 10,766,535 B2
(45) Date of Patent: Sep. 8, 2020

(54) VEHICLE BODY REAR PART STRUCTURE

(71) Applicant: HONDA MOTOR CO., LTD., Minato-ku, Tokyo (JP)

(72) Inventors: Yuki Muramatsu, Wako (JP); Shunsuke Kurai, Shimotsuke (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/000,940

(22) Filed: Jun. 6, 2018

(65) Prior Publication Data

US 2019/0009821 A1 Jan. 10, 2019

(30) Foreign Application Priority Data

Jul. 6, 2017 (JP) .................. 2017-133002

(51) Int. Cl.
- *B62D 21/15* (2006.01)
- *B62D 25/20* (2006.01)
- *B62D 25/08* (2006.01)

(52) U.S. Cl.
CPC .......... *B62D 21/155* (2013.01); *B62D 25/08* (2013.01); *B62D 25/2027* (2013.01); *B62D 25/2036* (2013.01)

(58) Field of Classification Search
CPC .. B62D 21/155; B25D 25/08; B25D 25/2027; B25D 25/2036
USPC ........................................ 296/187.11, 203.04
See application file for complete search history.

(56) References Cited

U.S. PATENT DOCUMENTS

| 4,684,151 A * | 8/1987 | Drewek ............... B62D 21/152 280/784 |
| 8,276,966 B2 * | 10/2012 | Souma .................. B62D 43/10 296/187.11 |
| 8,474,870 B1 * | 7/2013 | Ng ......................... B62D 25/00 180/311 |
| 2009/0146457 A1 | 6/2009 | Kanagai et al. |
| 2009/0278384 A1 | 11/2009 | Yamada et al. |

(Continued)

FOREIGN PATENT DOCUMENTS

| CN | 101454194 | 6/2009 |
| CN | 101574980 | 11/2009 |
| CN | 102259668 | 11/2011 |

(Continued)

OTHER PUBLICATIONS

Japanese Office Action for Japanese Patent Application No. 2017-133002 dated Mar. 19, 2019.

(Continued)

*Primary Examiner* — Joseph D. Pape

(74) *Attorney, Agent, or Firm* — Amin, Turocy & Watson, LLP

(57) ABSTRACT

A vehicle body rear part structure includes a rear side frame. The rear side frame includes a general part and a slope part. The general part extends substantially horizontally in at least one of an upper surface and a lower surface. The slope part extends so as to slope downward from the general part. A curved part is formed at a boundary between the general part and the slope part. The rear side frame includes two components which are a front side member and a rear side member. The curved part is provided on a joint part between the front side member and the rear side member.

6 Claims, 9 Drawing Sheets

(56) References Cited

U.S. PATENT DOCUMENTS

2011/0290838 A1   12/2011   Souma et al.

FOREIGN PATENT DOCUMENTS

| JP | 62-028673 | 2/1987 |
| JP | 04-303074 | 10/1992 |
| JP | 06-042549 | 6/1994 |
| JP | 06-044679 | 6/1994 |
| JP | 2000-142460 | 5/2000 |
| JP | 2008-001149 | 1/2008 |
| JP | 4120200 | 7/2008 |
| JP | 2012-171384 | 9/2012 |
| JP | 2015-044461 | 3/2015 |

OTHER PUBLICATIONS

Chinese Office Action for Chinese Patent Application No. 201810554955.X dated Jul. 1, 2020.

* cited by examiner

VEHICLE BODY REAR PART STRUCTURE

CROSS-REFERENCE TO RELATED APPLICATION

Priority is claimed on Japanese Patent Application No. 2017-133002, filed on Jul. 6, 2017, the contents of which are incorporated herein by reference.

BACKGROUND

Field of the Invention

The present invention relates to a vehicle body rear part structure.

Background

Among vehicle body rear part structures, a structure is known in which a rear side frame is provided on both side parts of a vehicle, a lower surface in the vicinity of a rear end part of the rear side frame is formed in a downward slope toward a vehicle body rearward direction, and a rear bumper is provided at a vehicle body rearward position of the rear side frame (for example, refer to Japanese Patent No. 4120200).

By forming the lower surface of the rear side frame in a downward slope, for example, when the height dimension of the rear side frame is not matched with the height dimension of the rear bumper, it is possible to match the rear side frame with the rear bumper in a vertical direction.

SUMMARY

However, when the lower surface of the rear side frame is formed in a downward slope, in the lower surface of the rear side frame, a curved part is formed at a boundary between a slope part of the downward slope and another region. Therefore, for example, when an impact load is input from a vehicle body rearward direction to the rear side frame due to a rear collision, a stress may concentrate on the curved part, and the rear side frame may be deformed at the curved part in the vertical direction.

An aspect of the present invention provides a vehicle body rear part structure capable of preventing a rear side frame from being deformed in a vertical direction.

(1) A vehicle body rear part structure according to an aspect of the present invention includes: a rear side frame, wherein the rear side frame includes: a general part that extends substantially horizontally in at least one of an upper surface and a lower surface; and a slope part that slopes upward or downward from the general part, the rear side frame includes two components which are a front side member and a rear side member, and a curved part that becomes a boundary between the general part and the slope part is provided on a joint part between the front side member and the rear side member.

In this way, the curved part is formed at the boundary between the general part and the slope part. The curved part is provided on the joint part between the front side member and the rear side member. At the joint part between the front side member and the rear side member, the front side member and the rear side member are overlapped with each other. Accordingly, the rigidity of the joint part is ensured. Thereby, it is possible to provide the curved part on the joint part having an ensured rigidity. Therefore, for example, when an impact load is input from a vehicle body rearward direction to the rear side frame due to a rear collision, it is possible to prevent the rear side frame from being deformed in the vertical direction from the curved part.

(2) In the vehicle body rear part structure described above, the rear side frame may include a fragile part that facilitates deformation at a time of rear collision, and the curved part may be provided at a more vehicle body frontward position than the fragile part.

In this way, the fragile part is provided on the rear side frame. Accordingly, for example, when an impact load is input from a vehicle body rearward direction to the rear side frame due to a rear collision, it is possible to facilitate deformation of the rear side frame from the fragile part by the input impact load. Thereby, it is possible to absorb the impact load that is input to the rear side frame.

The curved part is provided at a more vehicle body frontward position than the fragile part of the rear side frame. Thereby, it is possible to reduce the load that is transmitted to the curved part, and it is possible to further favorably prevent the rear side frame from being deformed in the vertical direction from the curved part.

(3) The vehicle body rear part structure described above may include: a reinforcement member that reinforces the rear side frame at an inner part of the rear side frame, wherein the reinforcement member may be provided between the curved part and the fragile part in a vehicle body front-to-rear direction.

In this way, the reinforcement member is provided between the curved part and the fragile part. Accordingly, the rigidity of the rear side frame at a more vehicle body frontward position than the fragile part is enhanced by the reinforcement member. Thereby, it is possible to further favorably prevent the rear side frame from being deformed in the vertical direction from the curved part by the impact load that is input to the rear side frame.

(4) In the vehicle body rear part structure described above, the rear side frame may include at least two joint points that are joined to a vehicle body and that are separated from each other in a vehicle body front-to-rear direction, and the reinforcement member may be arranged between the two joint points.

In this way, the reinforcement member is arranged between the two joint points. Accordingly, the reinforcement member can be reinforced by the two joint points. Thereby, it is possible to further enhance the rigidity of the rear side frame by the reinforcement member.

(5) In the vehicle body rear part structure described above, the rear side frame may include: a suspension attachment part to which a suspension apparatus is attached; and a suspension stiffener that reinforces the suspension attachment part, wherein the suspension stiffener may be provided to extend from the suspension attachment part to the curved part.

In this way, the suspension stiffener is provided to extend from the suspension attachment part to the curved part. Accordingly, it is possible to further reinforce the curved part by the suspension stiffener. Thereby, it is possible to further favorably prevent the rear side frame from being folded from the curved part.

(6) The vehicle body rear part structure described above may include an outrigger that extends outward in a vehicle width direction from the rear side frame, wherein an outrigger joint part of the rear side frame and the outrigger may be provided on the curved part.

In this way, the outrigger joint part of the rear side frame and the outrigger is provided on the curved part. Accordingly, it is possible to reinforce the curved part by the outrigger. Thereby, it is possible to further favorably prevent the rear side frame from being folded from the curved part.

(7) The vehicle body rear part structure described above may include: an inner wheel arch that is provided on an outer side in a vehicle width direction of the outrigger; and a connection member that connects together the outrigger and the inner wheel arch, wherein the outrigger may include a flange that extends continuously from the curved part to the connection member.

In this way, the outrigger and the inner wheel arch are connected together by the connection member. Accordingly, it is possible to solidly connect the inner wheel arch to the outrigger by the connection member. Thereby, it is possible to prevent a so-called opening of the inner wheel arch by the connection member.

Further, the flange of the outrigger extends continuously from the curved part to the connection member. Accordingly, it is possible to further enhance the rigidity of the curved part by the flange. Thereby, it is possible to further favorably prevent the rear side frame from being folded from the curved part.

According to an aspect of the present invention, the curved part is formed at the boundary between the general part and the slope part, and the curved part is provided on the joint part between the front side member and the rear side member. Thereby, it is possible to provide the curved part on the joint part having an ensured rigidity, and it is possible to prevent the rear side frame from being deformed in the vertical direction.

DESCRIPTION OF THE EMBODIMENTS

Figure 1:
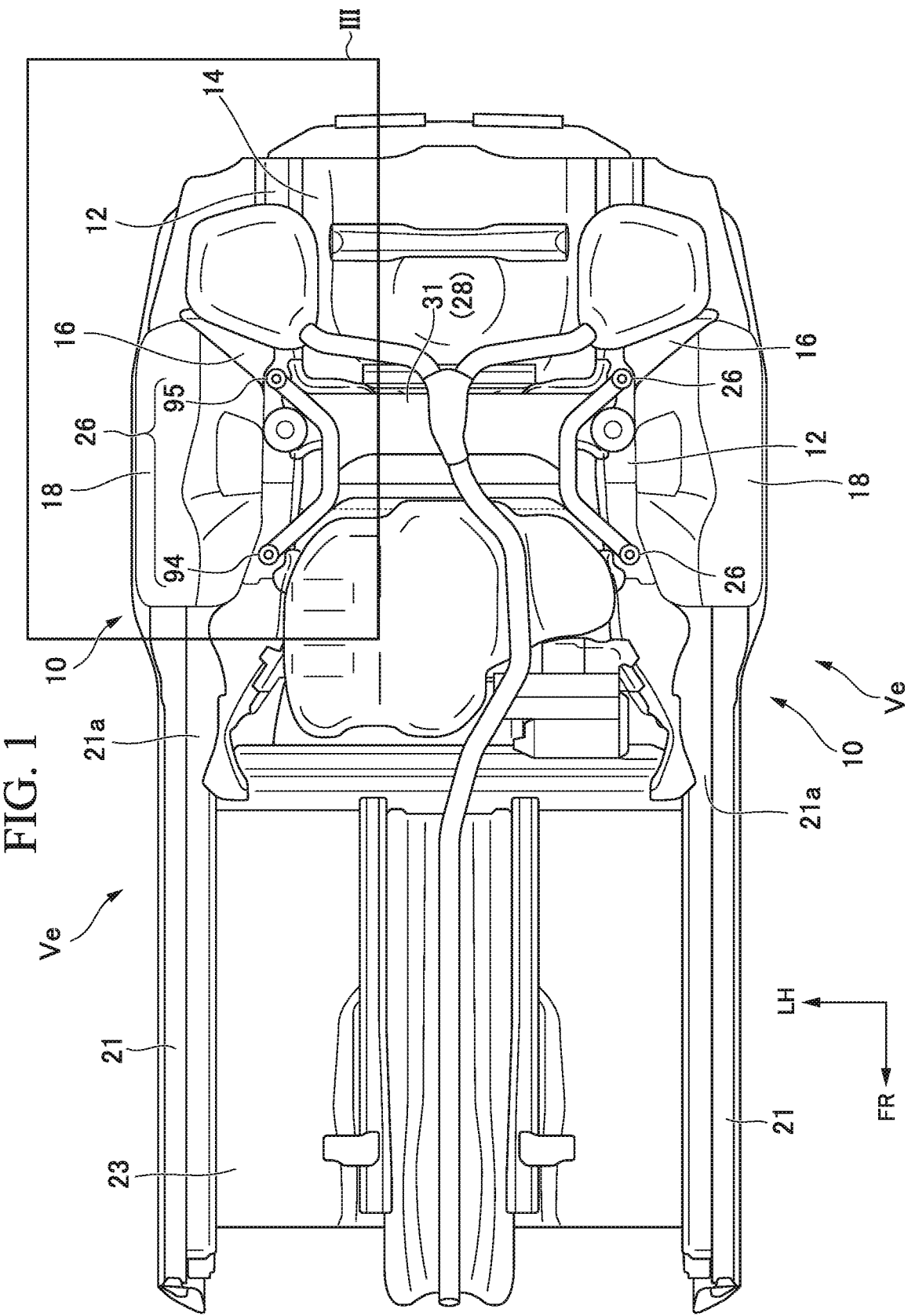
FIG. 1 is a bottom view showing a vehicle body rear part structure in an embodiment of the present invention.

An embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle.

Figure 2:
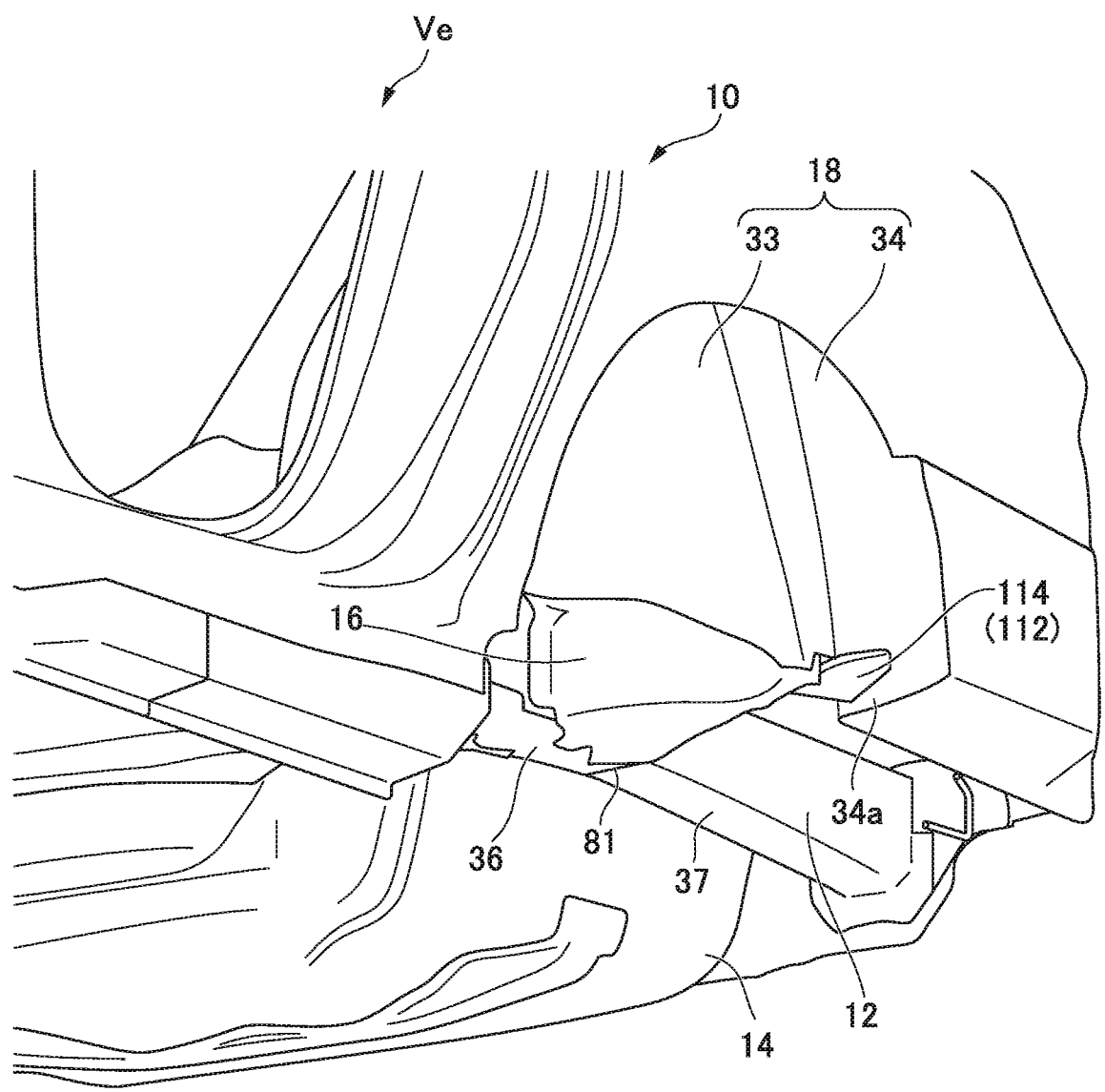
FIG. 2 is a perspective view showing a state seen from a frontward downward direction of the vehicle body rear part structure in the embodiment of the present invention.

As shown in FIG. 1 and FIG. 2, a vehicle body rear part structure 10 includes right and left rear side frames 12, a rear floor panel 14, right and left outriggers 16, and right and left wheel houses 18.

The left rear side frame 12 is provided on a left side of a vehicle body Ve and extends toward a vehicle body rearward direction from a rear end part 21a of a left side sill 21. The right rear side frame 12 is provided on a right side of a vehicle body Ve and extends toward a vehicle body rearward direction from a rear end part 21a of the right side sill 21.

A front floor panel 23 is provided between the left side sill 21 and the right side sill 21. A floor tunnel 24 is provided at a middle position in a vehicle width direction of the front floor panel 23.

A rear floor panel 14 is provided between the left rear side frame 12 and the right rear side frame 12. A left suspension support part 26 is provided on the left rear side frame 12. A right suspension support part 26 is provided on the right rear side frame 12. A subframe 31 of a suspension apparatus 28 is attached to the left suspension support part 26 and the right suspension support part 26.

The left outrigger 16 extends outward in the vehicle width direction from the left rear side frame 12.

The left wheel house 18 is provided on the left rear side frame 12 and the left outrigger 16. The right outrigger 16 extends outward in the vehicle width direction from the right rear side frame 12. The right wheel house 18 is provided on the right rear side frame 12 and the right outrigger 16.

The vehicle body rear part structure 10 has a substantially symmetric configuration in the right-to-left direction. Therefore, left configuration members are described, and descriptions of right configuration members are omitted.

For ease of understanding of the configuration, the left rear side frame 12 is described as a "rear side frame 12". The left suspension support part 26 is described as a "suspension support part 26". The left outrigger 16 is described as an "outrigger 16". The left wheel house 18 is described as a "wheel house 18".

Figure 3:
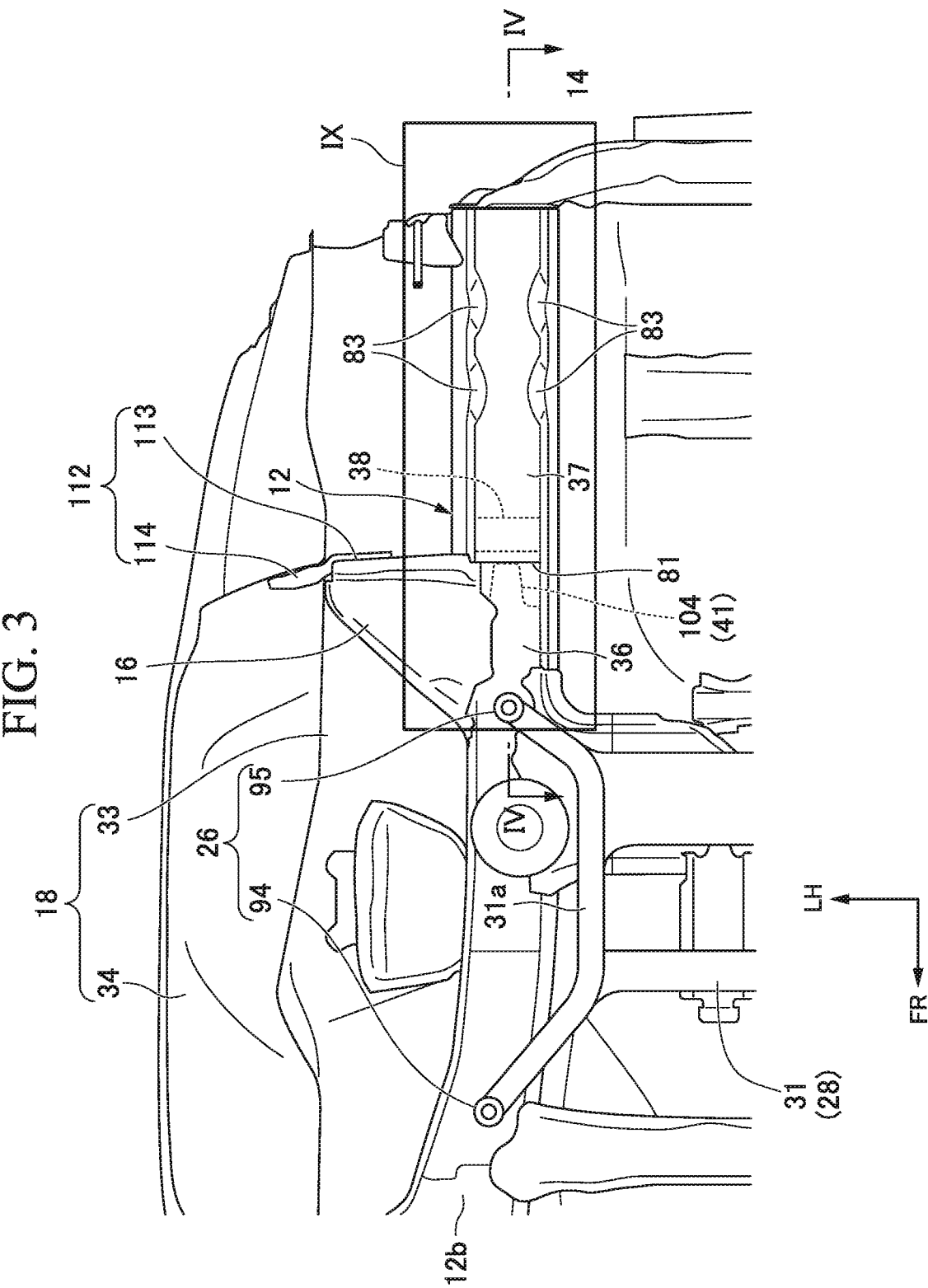
FIG. 3 is a bottom view showing an enlarged state of a III part of FIG. 1 in the embodiment of the present invention.

As shown in FIG. 3, the outrigger 16 extends outward in the vehicle width direction from the rear side frame 12. The wheel house 18 is provided on the rear side frame 12 and the outrigger 16. The wheel house 18 includes an inner wheel 33 and an inner wheel arch 34.

The inner wheel 33 is provided on the rear side frame 12 and the outrigger 16. The inner wheel arch 34 is provided on an outer side in the vehicle width direction of the inner wheel 33 and the outrigger 16.

Figure 4:
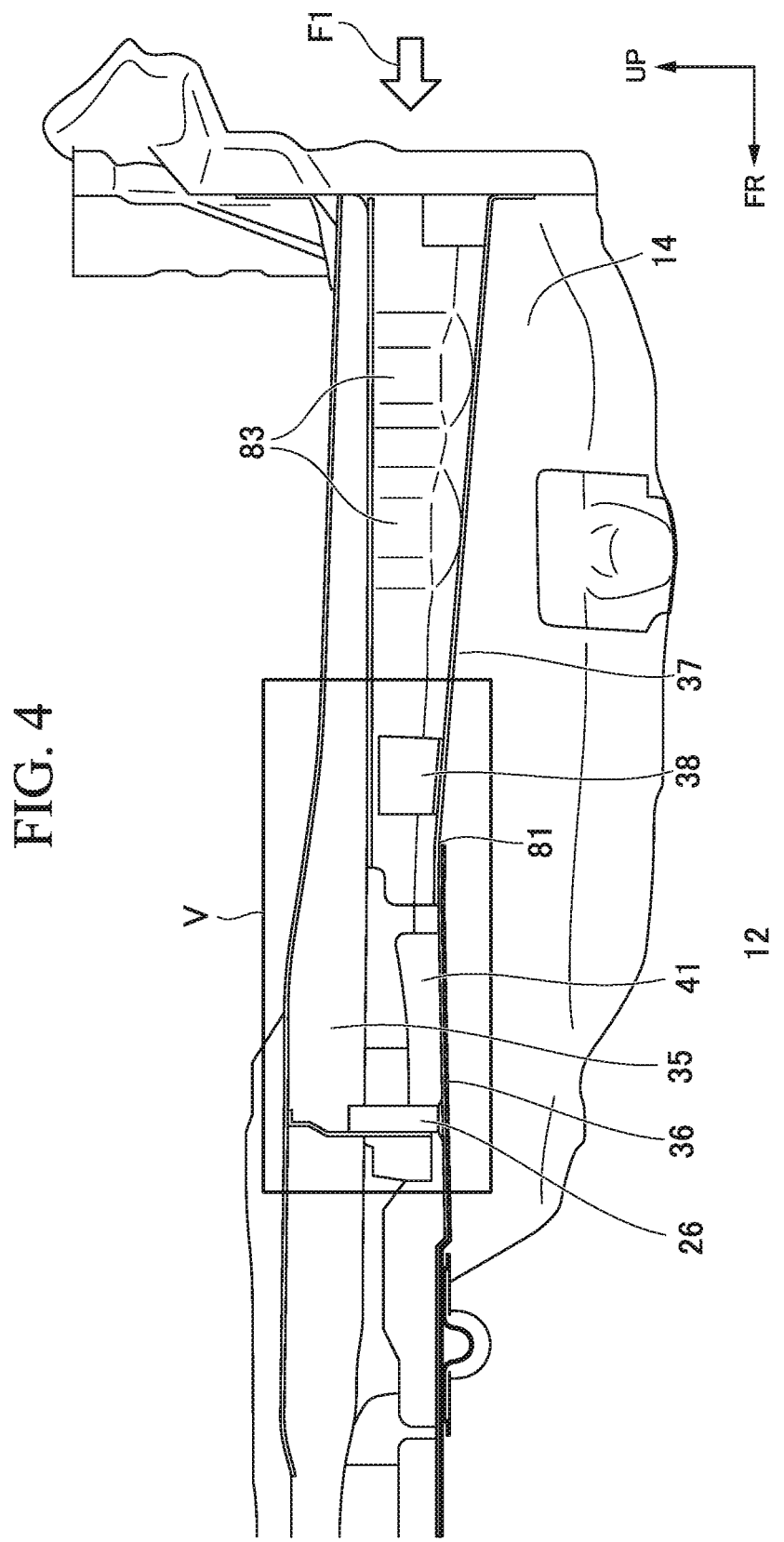
FIG. 4 is a cross-sectional view showing a state broken at a IV-IV line of FIG. 3 in the embodiment of the present invention.
Figure 5:
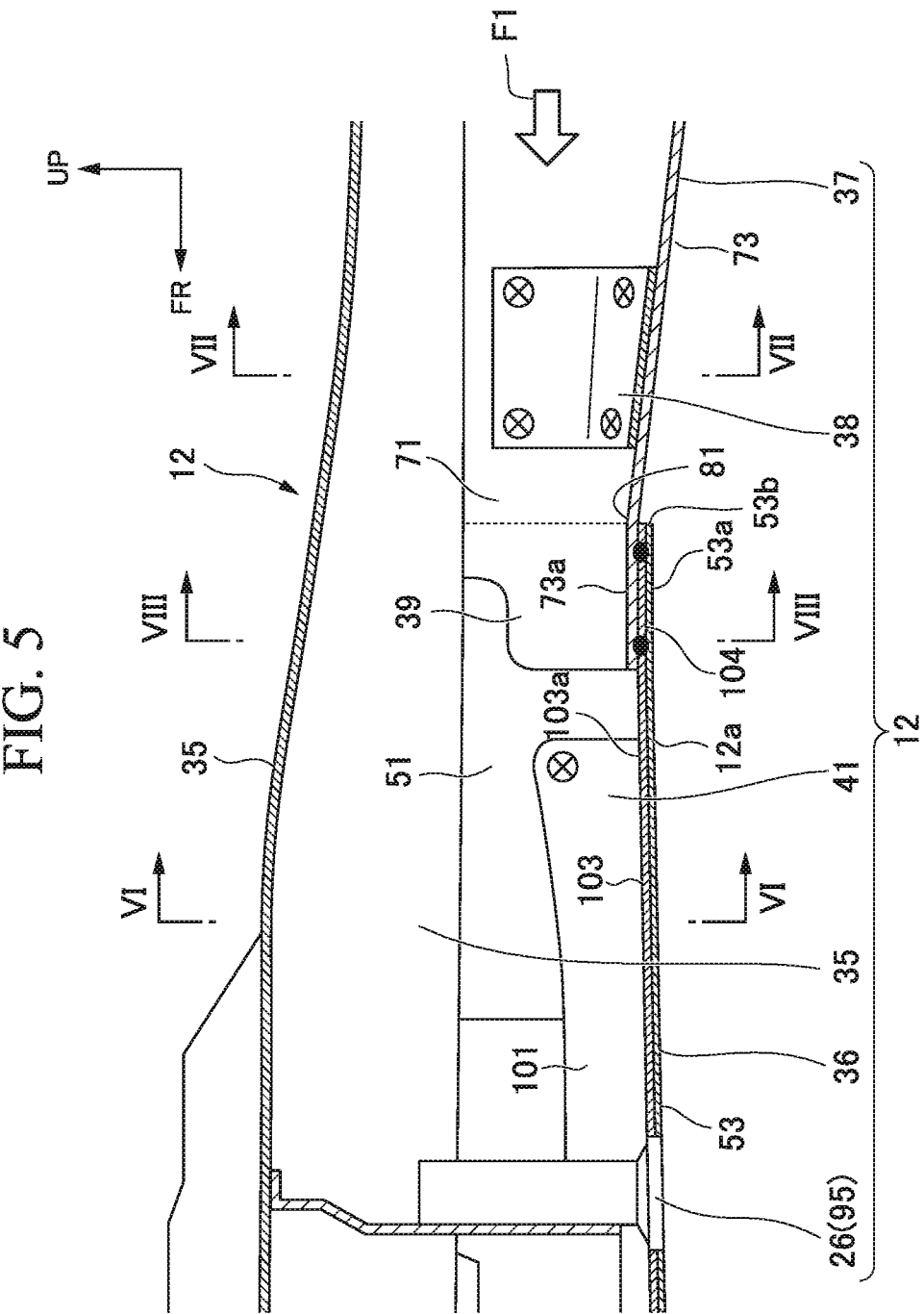
FIG. 5 is a cross-sectional view showing an enlarged state of a V part of FIG. 4 in the embodiment of the present invention.

As shown in FIG. 4 and FIG. 5, the rear side frame 12 includes an upper side member 35, a front side member 36, a rear side member 37, a reinforcement member 38, a suspension support part 26, and a suspension stiffener 41. The upper side member 35 extends toward a vehicle body rearward direction from the rear end part 21a (refer to FIG. 1) of the left side sill 21. The front side member 36 and the rear side member 37 are provided on a lower side of the upper side member 35.

Figure 6:
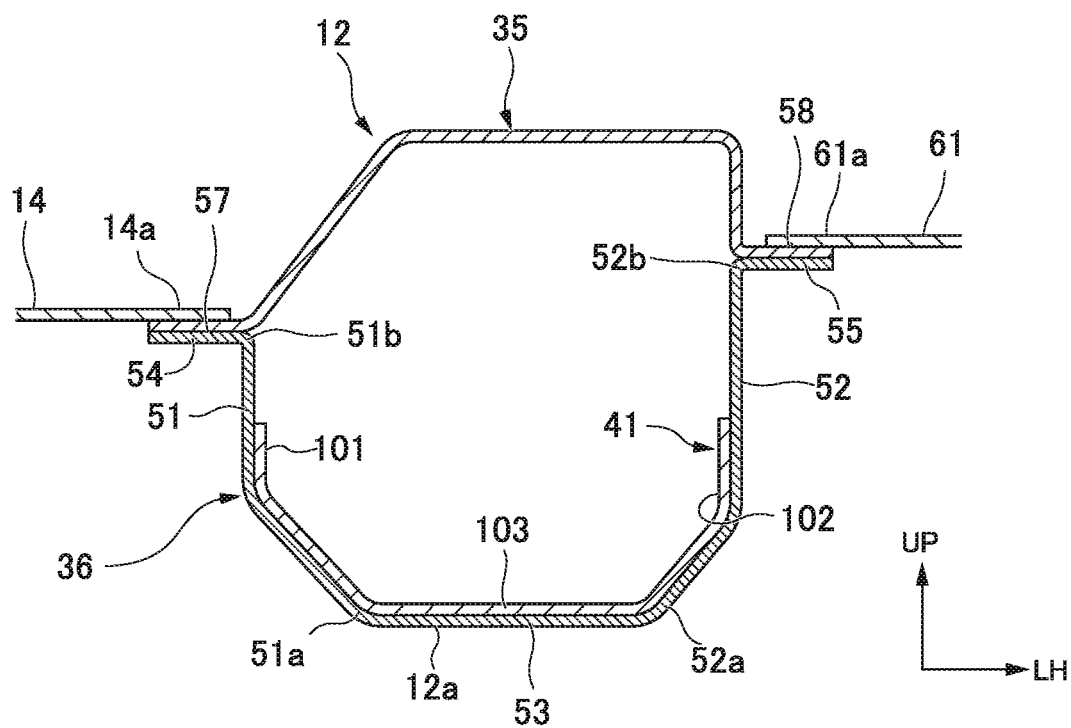
FIG. 6 is a cross-sectional view showing a state broken at a VI-VI line of FIG. 5 in the embodiment of the present invention.

As shown in FIG. 5 and FIG. 6, the front side member 36 extends toward a vehicle body rearward direction from the rear end part 21a (refer to FIG. 1) of the left side sill 21. The front side member 36 includes a first inner wall 51, a first outer wall 52, a general part 53, a first inner flange 54, and a first outer flange 55.

The first inner wall 51 is arranged to be spaced inward in the vehicle width direction with respect to the first outer wall 52. The general part 53 is connected to a lower end part 51a of the first inner wall 51 and a lower end part 52a of the first outer wall 52. A first inner flange 54 protrudes inward in the vehicle width direction from an upper end part 51b of the first inner wall 51. A first outer flange 55 protrudes outward in the vehicle width direction from an upper end part 52b of the first outer wall 52.

The upper side member 35 includes an inner joint piece 57 and an outer joint piece 58. The first inner flange 54, the inner joint piece 57, and a left part 14a of the rear floor panel 14 are in a state of being overlapped with one another and are joined together, for example, by a spot welding. The first outer flange 55, the outer joint piece 58, and an inner part 61a of an outer panel 61 are in a state of being overlapped with one another and are joined together, for example, by a spot welding.

In this state, the general part 53 of a front lower side part 43 is arranged below the rear floor panel 14. The general part 53 extends parallel with respect to the rear floor panel 14 (that is, substantially horizontally).

Figure 7:
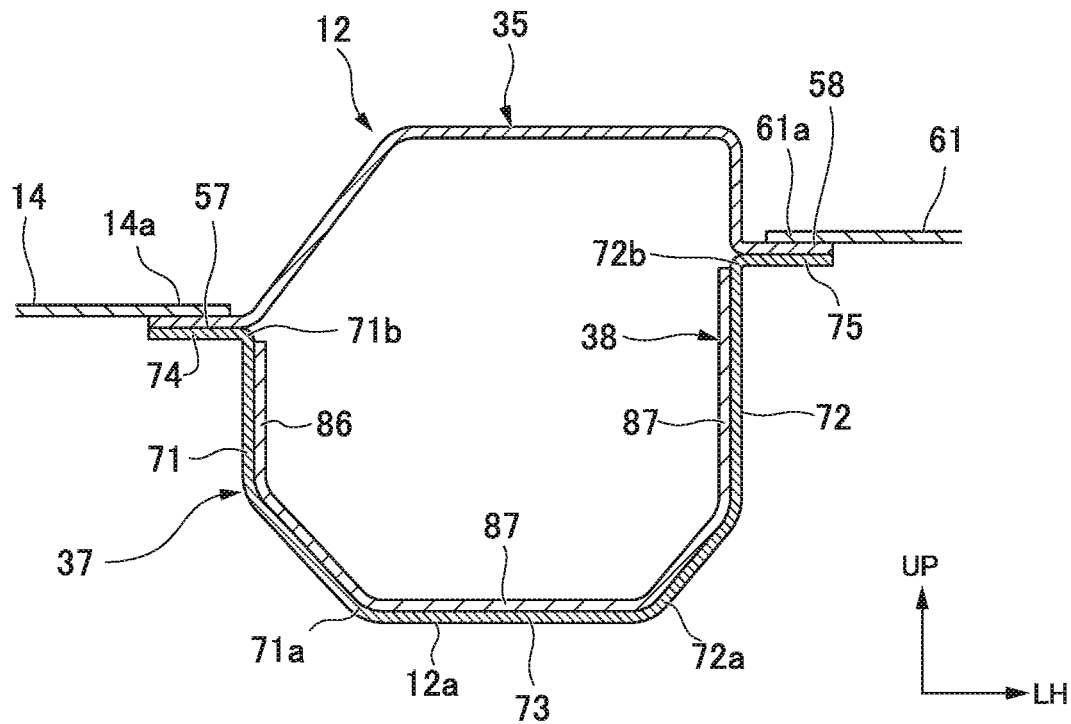
FIG. 7 is a cross-sectional view showing a state broken at a VII-VII line of FIG. 5 in the embodiment of the present invention.

As shown in FIG. 5 and FIG. 7, the rear side member 37 extends toward a vehicle body rearward direction from a rear end part of the front side member 36. The rear side member 37 includes a second inner wall 71, a second outer wall 72, a slope part 73, a second inner flange 74, and a second outer flange 75. The second inner wall 71 is arranged to be spaced inward in the vehicle width direction with respect to the second outer wall 72. The slope part 73 is connected to a lower end part 71a of the second inner wall 71 and a lower end part 72a of the second outer wall 72.

A second inner flange 74 protrudes inward in the vehicle width direction from an upper end part 71b of the second inner wall 71. A second outer flange 75 protrudes outward in the vehicle width direction from an upper end part 72b of the second outer wall 72.

The second inner flange 74, the inner joint piece 57, and the left part 14a of the rear floor panel 14 are in a state of being overlapped with one another and are joined together, for example, by a spot welding. The second outer flange 75, the outer joint piece 58, and the inner part 61a of the outer panel 61 are in a state of being overlapped with one another and are joined together, for example, by a spot welding.

In this state, the slope part 73 of a rear lower side part 64 is arranged below the rear floor panel 14. The slope part 73 extends so as to be sloped downward from the general part 53 with respect to the rear floor panel 14.

The slope part 73 has a horizontal section 73a at a front end portion of the slope part 73. The horizontal section 73a extends horizontally along a rear end section of the general part 53. The horizontal section 73a is in a state of being overlapped with the rear end section 53a of the general part 53 and is joined to the rear end section 53a. In this state, a bent part or curved part 81 is formed at a boundary between the general part 53 and the slope part 73.

Figure 8:
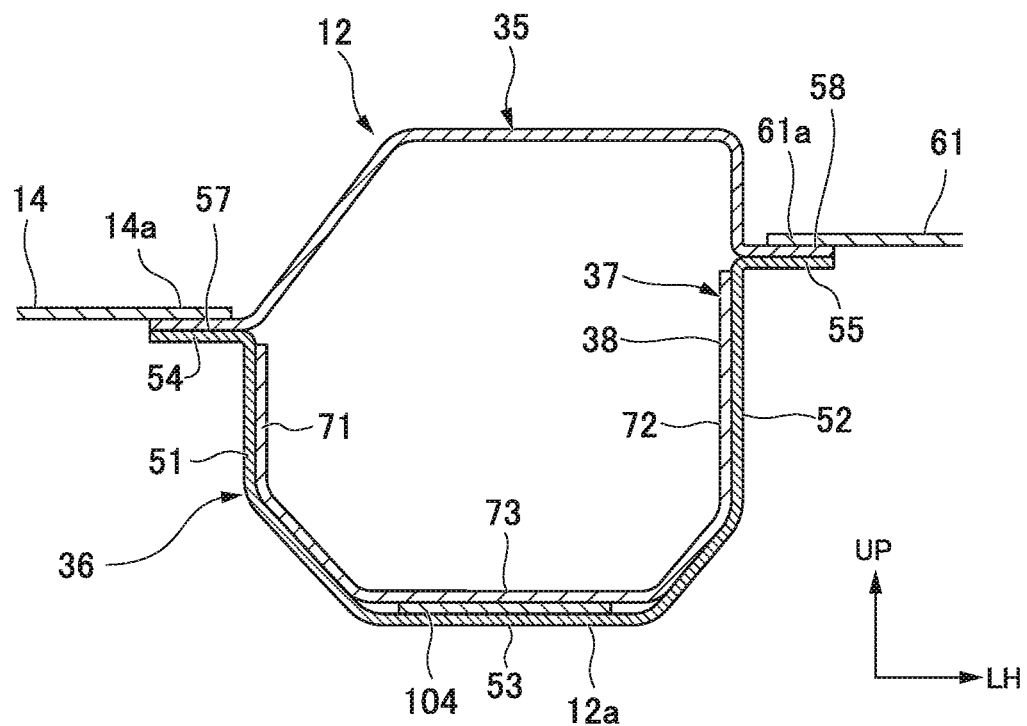
FIG. 8 is a cross-sectional view showing a state broken at a VIII-VIII line of FIG. 5 in the embodiment of the present invention.

As shown in FIG. 5 and FIG. 8, the first inner wall 51 and the second inner wall 71 are joined together in a joint part 39 between the front side member 36 and the rear side member 37. Further, the first outer wall 52 and the second outer wall 72 are joined together. Further, the rear end section 53a of the general part 53 is joined to the horizontal section 73a of the slope part 73. Accordingly, the rigidity of the joint part 39 between the front side member 36 and the rear side member 37 is enhanced.

The front side member 36 and the rear side member 37 are joined to the upper side member 35. Further, the front side member 36 and the rear side member 37 are joined together. Thereby, the rear side frame 12 is formed.

That is, the rear side frame 12 includes two components which are the front side member 36 and the rear side member 37. The rear side frame 12 is formed in a hollow closed cross-section. A lower surface 12a of the rear side frame 12 includes the general part 53 and the slope part 73.

The slope part 73 extends so as to be sloped downward and in a vehicle body rearward direction from the general part 53. Accordingly, the curved part 81 is formed at the boundary between the general part 53 and the slope part 73. The curved part 81 is provided at the joint part 39 between the front side member 36 and the rear side member 37.

Specifically, in a state where the rear end section 53a of the general part 53 and the horizontal section 73a of the slope part 73 are overlapped with each other, a downward slope of the slope part 73 is formed from a rear end 53b of the rear end section 53a.

The curved part 81 is formed in a region in which the downward slope is formed.

The front side member 36 and the rear side member 37 are overlapped with each other, and thereby, the rigidity of the joint part 39 is ensured. That is, the curved part 81 is provided on the joint part 39 having an ensured rigidity. Accordingly, for example, when an impact load F1 is input from a vehicle body rearward direction to the rear side frame 12 due to a rear collision, it is possible to prevent the rear side frame 12 from being deformed in the vertical direction from the curved part 81.

Figure 9:
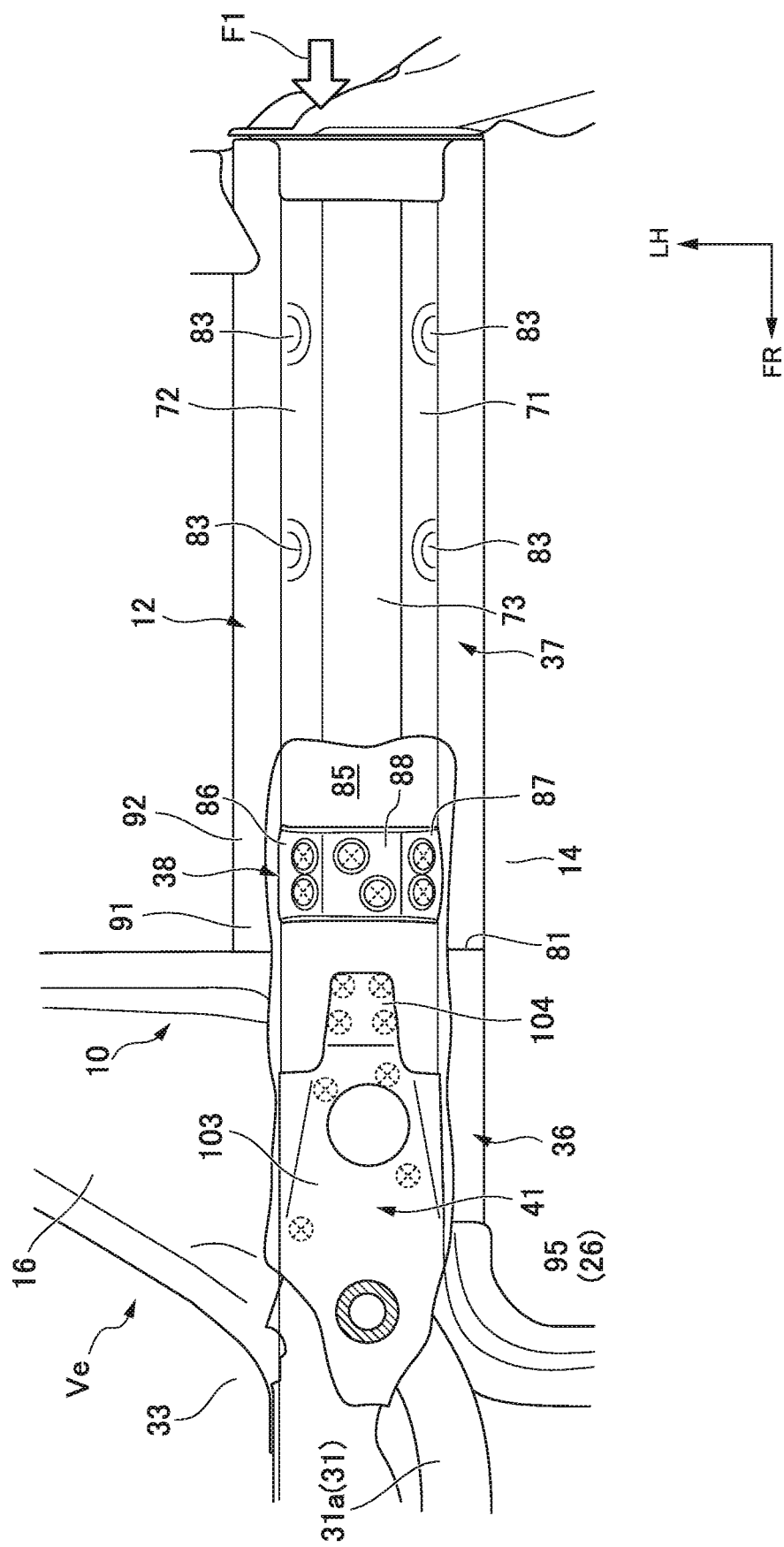
FIG. 9 is a bottom view showing an enlarged state of a IX part of FIG. 3 in the embodiment of the present invention.

As shown in FIG. 4 and FIG. 9, a plurality of fragile parts 83 are formed to be spaced from each other in the vehicle body front-to-rear direction on the rear side member 37 of the rear side frame 12. The plurality of fragile parts 83 are formed on the second inner wall 71 and the second outer wall 72 of the rear side member 37 in a curved shape so as to be recessed to the inner side of the rear side member 37. The plurality of fragile parts 83 facilitate deformation (specifically, crushing) of the rear side frame 12 by the impact load F1 that is input from the vehicle body rearward direction due to a rear collision.

Accordingly, for example, when an impact load F1 is input from a vehicle body rearward direction to the rear side frame 12, it is possible to facilitate crushing of the rear side frame 12 from the fragile part 83 by the input impact load F1. Thereby, it is possible to absorb the impact load F1 that is input to the rear side frame 12.

The plurality of fragile parts 83 are provided at a more vehicle body rearward position than the curved part 81. In other words, the curved part 81 is provided at a more vehicle body frontward position than the plurality of fragile parts 83. That is, it is possible to absorb the input impact load F1 by the crushing of the rear side frame 12 and to transmit the rest of the load to the curved part 81.

Thereby, it is possible to reduce the load that is transmitted to the curved part 81, and it is possible to favorably prevent the rear side frame 12 from being deformed in the vertical direction from the curved part 81.

The reinforcement member 38 is stored at an inner part 85 of the rear side frame 12. The reinforcement member 38 has a reinforcement inner wall 86, a reinforcement outer wall 87, and a reinforcement bottom part 88. The reinforcement inner wall 86 is joined to the second inner wall 71 of the rear side member 37 along the second inner wall 71 of the rear side member 37. The reinforcement outer wall 87 is joined to the second outer wall 72 along the second outer wall 72. The reinforcement bottom part 88 is joined to the slope part 73 of the rear lower side part 64 along the slope part 73 of the rear lower side part 64.

The reinforcement member 38 is formed of the reinforcement inner wall 86, the reinforcement outer wall 87, and the reinforcement bottom part 88 in a U shape in the cross-section. The reinforcement member 38 is provided at the inner part 85 of the rear side frame 12 (in detail, the rear side member 37), and thereby, the rear side frame 12 is reinforced by the reinforcement member 38.

The reinforcement member 38 is provided between the curved part 81 and the fragile part 83 in the vehicle body front-to-rear direction. Accordingly, the rigidity of the rear side frame 12 at a more vehicle body frontward position than the fragile part 83 is enhanced by the reinforcement member 38. Thereby, for example, it is possible to favorably prevent the rear side frame 12 from being deformed in the vertical direction from the curved part 81 by the impact load F1 that is input to the rear side frame 12 due to a rear collision.

Figure 10:
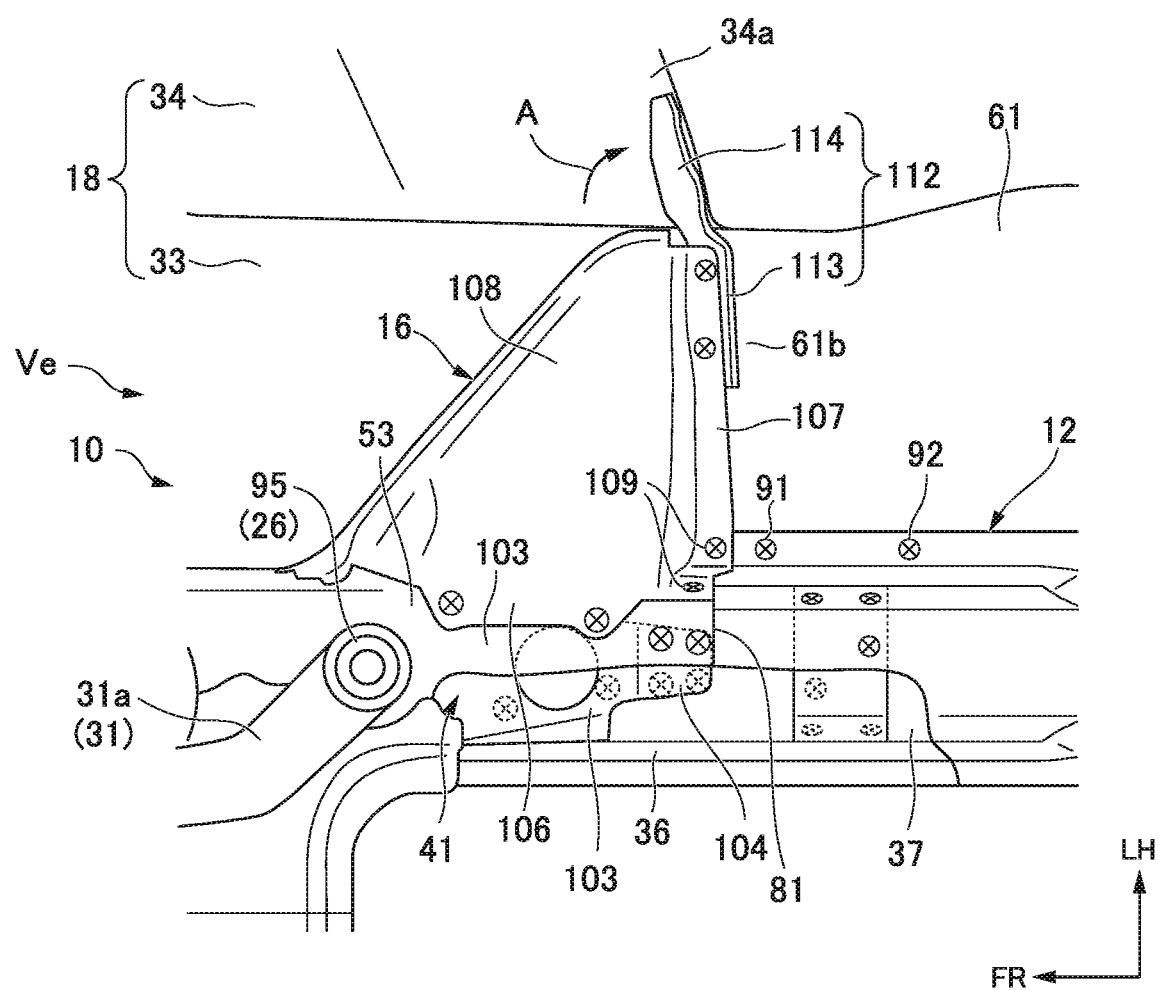
FIG. 10 is a bottom view showing an enlarged state of an outrigger of FIG. 3 in the embodiment of the present invention.

As shown in FIG. 9 and FIG. 10, the rear side frame 12 includes, for example, two joint points 91, 92. The two joint points 91, 92 are joined to the vehicle body Ve and are provided so as to be separated from each other in the vehicle body front-to-rear direction. In the vehicle body front-to-rear direction, the reinforcement member 38 is provided between the two joint points 91, 92.

Accordingly, the reinforcement member 38 is reinforced by the two joint points 91, 92. Thereby, the rigidity of the rear side frame 12 is further enhanced by the reinforcement member 38.

As shown in FIG. 3, the suspension support part 26 is provided on the rear side frame 12. A left end part 31$a$ of the subframe 31 is attached to the suspension support part 26. The suspension support part 26 includes a first suspension attachment part (suspension attachment part) 94 and a second suspension attachment part (suspension attachment part) 95.

The first suspension attachment part 94 is provided on a front end part 12$b$ side of the rear side frame 12. The second suspension attachment part 95 is provided at a vehicle body rearward position of the first suspension attachment part 94 to be spaced from the first suspension attachment part 94.

As shown in FIG. 5 and FIG. 6, a region of the rear side frame 12 (specifically, the front side member 36) to which the second suspension attachment part 95 is attached is reinforced by the suspension stiffener 41. The suspension stiffener 41 is provided to extend to the curved part 81 via the second suspension attachment part 95.

Specifically, the suspension stiffener 41 includes a stiffener inner wall 101, a stiffener outer wall 102, a stiffener bottom part 103, and a stiffener protrusion piece 104 (refer to FIG. 8).

The stiffener inner wall 101 is joined to the first inner wall 51 along the first inner wall 51. The stiffener outer wall 102 is joined to the first outer wall 52 along the first outer wall 52. The stiffener bottom part 103 is joined to the general part 53 along the general part 53. The suspension stiffener 41 is formed of the stiffener inner wall 101, the stiffener outer wall 102, and the stiffener bottom part 103 in a U shape in the cross-section.

Accordingly, a region of the rear side frame 12 (the front side member 36) to which the second suspension attachment part 95 is attached is reinforced by the suspension stiffener 41.

The stiffener protrusion piece 104 protrudes from a rear end 103$a$ of the stiffener bottom part 103 along the rear end section 53$a$ of the general part 53 toward the vehicle body rearward direction. The stiffener protrusion piece 104 is joined to the rear end section 53$a$ of the general part 53 and the horizontal section 73$a$ of the slope part 73 in a state of being interposed between and held by the rear end section 53$a$ of the general part 53 and the horizontal section 73$a$ of the slope part 73 (also refer to FIG. 8).

Accordingly, the curved part 81 is reinforced by the stiffener protrusion piece 104 (that is, the suspension stiffener 41). Thereby, it is possible to favorably prevent the rear side frame 12 from being folded from the curved part 81.

As shown in FIG. 10, the outrigger 16 extends outward in the vehicle width direction from the rear side frame 12. The outrigger 16 has a first side 106, a second side 107, and a third side 108 in a bottom view. Hereinafter, the second side 107 is referred to as an "outrigger flange 107 (flange)". The third side 108 is referred to as a "slope side 108".

The outrigger 16 is formed of the first side 106, the outrigger flange 107, and the slope side 108 in a substantially triangular shape in a bottom view.

The first side 106 extends in the vehicle body front-to-rear direction along the stiffener bottom part 103 and the general part 53 of the front side member 36 and is joined to the general part 53 and the stiffener bottom part 103. The outrigger flange 107 extends in the vehicle width direction along the outer panel 61 and the curved part 81 of the rear side frame 12 and is joined to the curved part 81 and the outer panel 61.

That is, an outrigger joint part 109 at which the rear side frame 12 and the outrigger 16 are joined together is provided on the curved part 81. Accordingly, the curved part 81 is reinforced by the outrigger 16. Thereby, it is possible to favorably prevent the rear side frame 12 from being folded from the curved part 81 by the outrigger 16.

The inner wheel arch 34 is provided on an outer side in the vehicle width direction of the outrigger 16. The inner wheel arch 34 is connected by a connection member 112. The connection member 112 has a base part 113 and a support part 114. The base part 113 is joined to the outrigger flange 107 and a front end 61$b$ of the outer panel 61 so as to extend in the vehicle width direction in a state of being interposed between and held by the outrigger flange 107 and the front end 61$b$ of the outer panel 61.

The support part 114 extends outward in the vehicle width direction from the base part 113 along the inner wheel arch 34 and is joined to a rear end part 34$a$ of the inner wheel arch 34. Accordingly, the outrigger flange 107 and the inner wheel arch 34 are connected together by the connection member 112.

In this way, the outrigger flange 107 and the inner wheel arch 34 are connected together by the connection member 112. Accordingly, the inner wheel arch 34 is solidly connected to the outrigger flange 107 by the connection member 112. Thereby, it is possible to prevent, by the connection member 112, the inner wheel arch 34 from opening in an arrow A direction.

Further, the outrigger flange 107 extends in the vehicle width direction continuously from the curved part 81 to the connection member 112. Accordingly, it is possible to further enhance the rigidity of the curved part 81 by the outrigger flange 107. Thereby, it is possible to further favorably prevent the rear side frame 12 from being folded from the curved part 81.

The technical scope of the present invention is not limited to the embodiment described above, and a variety of changes can be added without departing from the scope of the invention.

For example, the embodiment is described using an example in which the general part 53 and the slope part 73 are formed on the lower surface 12$a$ of the rear side frame 12, and the curved part 81 is provided on the lower surface 12$a$; however, the embodiment is not limited thereto. As other examples, for example, it is also possible to provide the curved part 81 on an upper surface 12c of the rear side frame 12.

The embodiment is described using an example in which the rear end section 53a of the general part 53 extends horizontally, the front end part of the slope part 73 is the horizontal section 73a, and the curved part 81 is formed at a boundary between the rear end 53b of the rear end section 53a and the rear end of the horizontal section 73a; however, the embodiment is not limited thereto.

As other examples, for example, it is also possible to extend the rear end section 53a of the general part 53 in a slope shape having a downward slope and form the front end part (that is, the horizontal section 73a) of the slope part 73 in a slope shape. In this case, the curved part 81 is formed at the boundary between a front end of the rear end section 53a and a front end of the horizontal section 73a.

The embodiment is described using an example in which the two joint points 91, 92 are provided on the rear side frame 12; however, the embodiment is not limited thereto. As other examples, for example, it is also possible to provide three or more joint points on the rear side frame 12.

The embodiment is described using an example in which, when an impact load is input from a vehicle body rearward direction to the rear side frame 12, crushing of the rear side frame 12 is facilitated by the fragile part 83 of the rear side frame 12; however, the embodiment is not limited thereto. As other examples, for example, it is also possible to set the fragile part 83 so as to fold the rear side frame 12 in the vehicle width direction. It is possible to absorb the impact energy by folding the rear side frame 12 in the vehicle width direction.

What is claimed is:

1. A vehicle body rear part structure, comprising:
    a rear side frame; and
    an outrigger that extends outward in a vehicle width direction from the rear side frame,
    wherein the rear side frame comprises: a general part that extends substantially horizontally in a lower surface of the rear side frame, a slope part that slopes downward from the general part, and a bent part at a boundary between the general part and the slope part,
    the rear side frame comprises two components which are a front side member and a rear side member,
    the bent part is provided on a joint part between the front side member and the rear side member, and
    an outrigger joint part at which the rear side frame and the outrigger are joined together is provided on the bent part.

2. The vehicle body rear part structure according to claim 1,
    wherein the rear side frame comprises a fragile part that facilitates deformation at a time of rear collision, and
    the bent part is provided at a more vehicle body frontward position than the fragile part.

3. The vehicle body rear part structure according to claim 2, comprising:
    a reinforcement member that reinforces the rear side frame at an inner part of the rear side frame,
    wherein the reinforcement member is provided between the bent part and the fragile part in a vehicle body front-to-rear direction.

4. The vehicle body rear part structure according to claim 3,
    wherein the rear side frame comprises at least two joint points that are joined to a vehicle body and that are separated from each other in a vehicle body front-to-rear direction, and
    the reinforcement member is arranged between the two joint points.

5. The vehicle body rear part structure according to claim 1,
    wherein the rear side frame comprises:
        a suspension attachment part to which a suspension apparatus is attached; and
        a suspension stiffener that reinforces the suspension attachment part, and
    wherein the suspension stiffener is provided to extend from the suspension attachment part to the bent part.

6. The vehicle body rear part structure according to claim 1, comprising:
    an inner wheel arch that is provided on an outer side in a vehicle width direction of the outrigger; and
    a connection member that connects together the outrigger and the inner wheel arch,
    wherein the outrigger comprises a flange that extends continuously from the bent part to the connection member.

* * * * *